US000001368H

United States Statutory Invention Registration [19]

[11] Reg. Number: H1368

Fraytet

[43] Published: Nov. 1, 1994

[54] METHOD FOR IMPROVING THE LONG-TERM COLOR STABILITY OF JET FUEL

[76] Inventor: Michael C. Fraytet, 4656 Ironwood Ave., Seal Beach, Calif. 90740

[21] Appl. No.: 989,292

[22] Filed: Dec. 11, 1992

[51] Int. Cl.[5] ..... C10G 17/06

[52] U.S. Cl. ..... 208/254 R; 208/266; 208/273; 208/254 H; 44/300

[58] Field of Search ..... 208/254 R, 266; 44/457, 44/458

[56] References Cited

U.S. PATENT DOCUMENTS

| | | | |
|---|---|---|---|
| Re. 31,363 | 8/1983 | Stover | 208/254 R |
| 2,882,225 | 4/1959 | Johnston, Jr. | 208/266 |
| 2,999,807 | 9/1961 | Buningh et al. | 208/254 R |
| 3,487,012 | 12/1969 | Plummer et al. | 208/273 |
| 4,231,858 | 11/1980 | Seitzer et al. | 208/254 R |
| 4,539,096 | 9/1985 | Rudnick | 208/254 R |

*Primary Examiner*—Donald P. Walsh
*Assistant Examiner*—John N. Greaves
*Attorney, Agent, or Firm*—F. Lindsey Scott

[57] ABSTRACT

A method for improving the long-term color stability of jet fuel and jet fuel blends containing nitrogen compounds, by intimately mixing the jet fuel with a quantity of concentrated sulfuric acid sufficient to remove at least about ninety percent (90%) of said nitrogen compounds during a contact time equal to less than five (5) minutes, separating the jet fuel from the concentrated sulfuric acid, mixing the jet fuel with an aqueous caustic solution to remove residual acid from the jet fuel, separating the jet fuel from the aqueous caustic solution, mixing the jet fuel with water, and separating the jet fuel from the water.

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

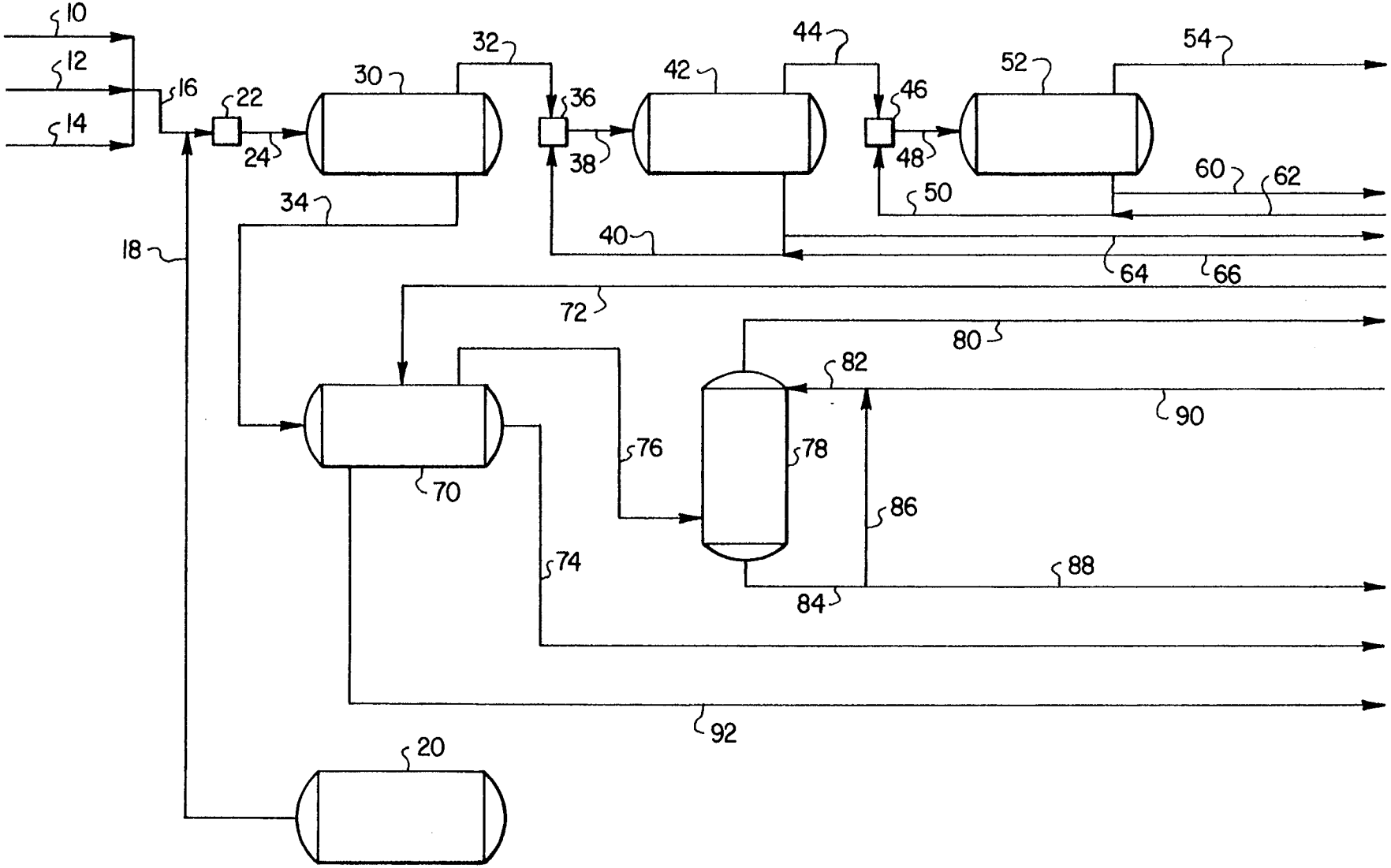
10
12
14
16
18
20
22
24
30
32
34
36
38
40
42
44
46
48
50
52
54
60
62
64
66
70
72
74
76
78
80
82
84
86
88
90
92

METHOD FOR IMPROVING THE LONG-TERM COLOR STABILITY OF JET FUEL

BACKGROUND OF THE INVENTION

1. Field of the Invention

This invention relates to the improvement of the long-term color stability of jet fuel by removing nitrogen compounds by contacting the jet fuel with concentrated sulfuric acid.

2. Background Art

Jet fuel is used in military and non-military aircraft as a fuel. This fuel is widely used and is commonly sold in accordance with military specifications. Jet fuel is used in such quantities that it is a major product of many refineries. Jet fuel generally comprises a mixture of aromatic, olefinic and paraffinic compounds typically having a boiling range from about 350° F. to about 590° F. Typically, about twenty-four percent (24%) of the fuel comprises aromatic compounds, about five percent (5%) of the fuel comprises olefinic compounds and the balance comprises paraffinic compounds. Jet fuel can be produced from a variety of refinery streams but is most frequently produced from streams resulting from crude oil fractionation, and hydrocracking processes such as fixed bed catalytic hydrocracking and the like. Other sources of jet fuel constitute any suitable boiling range stream in the refinery which otherwise meets the requirements for jet fuel. One such stream is the jet fuel boiling range fractionator product from a petroleum coking operation. These fuels tend to be higher in sulfur and nitrogen than the straight run jet fuel fractions or the hydrocracker jet fuel fractions. Nonetheless, they constitute a valuable hydrocarbon product and after suitable desulfurization have been used frequently as a component of jet fuel blends.

Jet fuels meeting military specifications have been observed in recent years in some instances to develop undesirable color upon standing. While these jet fuels met all applicable specifications initially, the color develops upon storage for extended periods of time. At least one customer has developed a test for long-term color stability and has expressed interest in requiring that jet fuels have long-term color stability.

Accordingly, it would be highly desirable if jet fuels and jet fuel blends could be treated to produce desirable long-term color stability.

SUMMARY OF THE INVENTION

According to the present invention, a method is provided for improving the long-term color stability of jet fuel and jet fuel blends containing nitrogen compounds, by intimately mixing the jet fuel with a quantity of concentrated sulfuric acid sufficient to remove at least ninety percent (90%) of the nitrogen compounds during a contact time of less than five minutes, separating the jet fuel from the concentrated sulfuric acid, mixing the jet fuel with an aqueous caustic solution to remove residual acid from the jet fuel, separating the jet fuel from the aqueous caustic solution, mixing the jet fuel with water, and separating the jet fuel from the water.

BRIEF DESCRIPTION OF THE DRAWING

The Figure is a schematic diagram of an embodiment of the process of the present invention.

DESCRIPTION OF A PREFERRED EMBODIMENT

The Figure is a schematic diagram and does not include pumps, valves and other equipment known to the art for accomplishing the indicated stream flows and the like.

In the Figure, a straight-run jet fuel or jet fuel component stream is charged to the process through a line 10. The term "straight-run" products refers to products which are recovered by fractionation from the crude oil charged to a refinery in the initial crude oil distillation without cracking and the like. Of course such products are further refined after the initial separation, but the term straight-run generally refers to products which have been recovered by distillation from crude oil with no catalytic cracking or the like. Such a straight-run jet fuel range stream is charged to the process through line 10. A jet fuel range stream from a petroleum coking operation is charged to the process through a line 12. The stream in line 12 has been partly desulfurized and partly denitrogenated. The stream charged through line 14 is a jet fuel range stream from a hydrocracking operation. These streams, as shown, are blended and passed through a line 16 to a mixer 22. A concentrated sulfuric acid stream is charged to the process through a line 18 and is mixed with the jet fuel stream in line 16 in mixer 22 to intimately mix the jet fuel or the jet fuel blend and the concentrated sulfuric acid. Desirably, the concentrated sulfuric acid is at least 95 weight percent sulfuric acid and preferably is about 98 weight percent sulfuric acid. It is necessary that the mixing be intimate and that the sulfuric acid be dispersed in the jet fuel in the form of droplets smaller than about 300 microns. This mixing is readily accomplished by devices such as double-port mixing valves, in-line mixers and the like, as known to those skilled in the art. The resulting mixture is passed through a line 24 to a settler 30. Desirably, settler 30 contains an electrically assisted separator where very rapid separation of the sulfuric acid and fuel is accomplished. The spent sulfuric acid is recovered through a line 34 and passed to a spent acid drum 70. The separated jet fuel is recovered from settler 30 through a line 32 and passed to a mixer 36 where it is mixed with a caustic solution from a line 40 to neutralize any remaining acidic components in the jet fuel. The resulting mixture is passed through a line 38 into a settler 42 which is desirably an electrically assisted separator where the aqueous caustic solution is separated from the jet fuel. The jet fuel is recovered through a line 44 and passed to a mixer 46 where it is mixed with a water stream from a line 50. The resulting mixture is passed through a line 48 to a settler 52 which is preferably an electrically assisted separator where the jet fuel is separated from the water and passed through a line 54 to further processing.

In the practice of the present process, make-up caustic is supplied as necessary through a line 66 to ensure that any acidic compounds remaining in the jet fuel from line 32 are removed. Spent caustic solution is withdrawn through a line 64. A suitable aqueous caustic solution is a 3 percent aqueous sodium hydroxide solution. The aqueous caustic solution can vary in strength and, if preferred, other alkaline materials can be used. The aqueous caustic solution is recycled through line 40, as shown. Mixer 36 may be an eductor or other suitable form of mixer. Similarly, mixer 46 may also be an eductor.

The water mixed with the jet fuel in mixer 46 is supplied through line 50 and may be recycled water. Make-up water is supplied through a line 62 and water is withdrawn through a line 60 as necessary to maintain the desired water properties. The water is desirably maintained at a pH from about 8 to about 12.

The jet fuel recovered through line 54 may be passed to further treatment in either or both a salt tower and a clay tower, as known to those skilled in the art. The salt tower is generally used to further dehydrate the jet fuel and the clay tower is used to selectively remove ionic components from the jet fuel. Such towers are widely used in the production of jet fuel and are well-known to those skilled in the art. Such towers constitute no part of the present invention and will not be discussed further.

In the operation of mixer 22 it has been indicated previously that it is important that intimate mixing of the fuel and concentrated acid be accomplished. It is desirable that this mixing be accomplished very efficiently and quickly and that the contact time of the acid (from mixing until separation) with the jet fuel be carefully controlled. This time should be less than five minutes, and desirably is less than about one minute, and even more desirably, is less than about thirty seconds, possibly less than about ten seconds. The flow of jet fuel through mixer 22 should be at a relatively high rate relative to the size of the equipment used so that the fuel passes quickly into settler 30 where it is passed into contact with charged plates as well known to those skilled in the art to quickly separate the acid from the jet fuel.

This procedure results in removal of the nitrogen compounds from the jet fuel which have been found to be the color precursors. Removal of these nitrogen compounds is readily accomplished by contact with the concentrated acid which should be used in an amount sufficient to remove at least about ninety percent (90%) of the nitrogen compounds during the short contact time. Amounts of acid suitable to accomplish this removal may vary from one to twenty-five times the stoichiometric amount of acid necessary to react with all of the nitrogen compounds. The amount can be readily selected and optimized by those skilled in the art based upon an evaluation of the specific jet fuel stream to be treated. Very desirable results have been achieved when twenty-five times the stoichiometric amount was used. It is undesirable that the contact period be extended because extension of the contact period tends to result in reaction of the sulfuric acid with materials such as thiophenes and olefins which are desirable components of the jet fuel product. Accordingly, the presence of an excessive amount of concentrated sulfuric acid over a prolonged contact period will result in the loss of desirable fuel components with no corresponding benefit to the fuel properties. Accordingly, it is necessary that the contact period be kept short and it is desirable that the amount of acid used be minimized consistent with the removal of a sufficient amount of the nitrogen compounds. Such optimizations are readily accomplished by those skilled in the art based upon the individual fuels treated and the use of standard test procedures such as ASTM procedure D-4629 for nitrogen.

It has been found that the removal of these nitrogen compounds results in remarkably improved, long-term color stability in the fuel. It has also been observed that, when straight-run jet fuel streams are used, the nitrogen content of these streams is generally sufficiently low so that no long-term color stability problems are encountered. Hydrocracker process jet fuel streams contain relatively little nitrogen and generally do not have long-term color stability problems.

Petroleum coker jet fuel streams, when used alone or with other jet fuel component streams, have been suitable to meet jet fuel specifications. However, these streams generally contain larger quantities of nitrogen and appear to be a major cause of the long-term color instability of jet fuels. Accordingly, the present process will be found effective to improve the color stability of jet fuel streams produced from a petroleum coking unit or other unit which results in the presence of a substantial quantity of nitrogen compounds in the fuel and to treat jet fuel blends which contain jet fuel from petroleum coker processes or other processes which result in the presence of nitrogen compounds in the fuel. Surprisingly, the removal of these compounds results in greatly improved color stability.

In the Figure, the concentrated sulfuric acid recovered from settler 30 through line 34 is passed to a spent acid vessel 70 which is generally blanketed with gas supplied through line 72. A gas stream containing sulfur oxides may be released from spent acid tank 70 through line 76 and is passed to a sulfur oxide scrubber 78 where the gas stream is contacted with an aqueous alkaline solution supplied through a line 82. The scrubbed gases are discharged through a line 80 to flare gas, recovery or the like. The spent aqueous caustic solution is recovered through a line 84 and may be recycled through a line 86 to caustic inlet 82. Fresh caustic make-up solution is supplied through a line 90 and spent caustic solution is withdrawn through line 88 to maintain a desired aqueous caustic solution concentration. Aqueous solutions of sodium hydroxide are also suitable for use in scrubber 78. The solutions may be of varying concentrations, as known to those skilled in the art, and other alkaline materials can be used.

The spent acid is recovered from spent acid tank 70 through a line 92 and passed to aci reconstitution, neutralization or the like.

The color is generally tested by ASTM procedure D-156 and is referred as SAYBOLT color. Generally it is desirable that the SAYBOLT color be stabilized to a range of 15 to 20 on the ASTM D-156 range.

EXAMPLE

A fuel sample was tested according to the following procedure.

Quantity

Fuel was placed in an open top vessel which was then placed in a sealable bomb container which was then pressured to 35 psig with air. The bomb was then heated to 100° C. and maintained at 100° C. for four days. After the four-day test, the fuel sample was cooled and its color tested. The tested jet fuel (before treatment) had a SAYBOLT color of 19 and contained 36 parts per million (ppm) nitrogen (ASTM D-4629). After treatment by the process of the present invention, the SAYBOLT color was improved to 22 and the nitrogen content was reduced to 2 ppm. After the four-day test, the SAYBOLT color for the treated jet fuel was 16. In a similar four-day test performed on the same jet fuel with no treatment, the SAYBOLT color after the four-day test was negative seven (−7). Clearly, the process of the present invention has made a major improvement in the long-term color stability of the treated jet fuel.

Having thus described the present invention by reference to certain of its preferred embodiments, it is respectfully pointed out that the embodiments described are illustrative rather than limiting in nature and that many variations and modifications are possible within the scope of the present invention. Many such variations and modifications may appear obvious and desirable to those skilled in the art based upon a review of the foregoing description of preferred embodiment and the Example.

Having thus described the invention, I claim:

1. A method for improving the long-term color stability of jet fuel containing nitrogen compounds, said method consisting essentially of:

a) intimately mixing said jet fuel with a quantity of concentrated sulfuric acid, at least about 98 percent sulfuric acid, sufficient to remove at least about 90 percent of said nitrogen compounds during a contact time equal to less than about 30 seconds;
b) separating said jet fuel from said concentrated sulfuric acid within said contact time;
c) mixing said jet fuel with an aqueous caustic solution to remove residual acid from said jet fuel;
d) separating said jet fuel from said aqueous caustic solution;
e) mixing said jet fuel with water; and
f) separating said jet fuel from said water.

2. The method of claim 1 wherein said contact time is less than about 10 seconds.

3. The method of claim 1 wherein said aqueous caustic solution is an aqueous sodium hydroxide solution.

4. The method of claim 1 wherein said jet fuel and said concentrated sulfuric acid are mixed to disperse said concentrated sulfuric acid in said jet fuel as droplets less than about 300 microns in diameter.

5. The method of claim 1 wherein said concentrated sulfuric acid is mixed with said jet fuel in an amount equal to from about 1 to about 25 times the stoichiometric amount of concentrated sulfuric acid necessary to react with said nitrogen compounds.

6. A method for improving the long-term color stability of a jet fuel blend including hydrocarbon compounds recovered from a petroleum coking process and containing nitrogen compounds, said method consisting essentially of:

a) intimately mixing said jet fuel blend with a quantity of concentrated sulfuric acid, at least about 98 percent sulfuric acid, sufficient to remove at least about 90 percent of said nitrogen compounds during a contact time equal to less than about 30 seconds;
b) separating said jet fuel blend from said concentrated sulfuric acid within said contact time;
c) mixing said jet fuel blend with an aqueous caustic solution to remove residual acid from said jet fuel blend;
d) separating said jet fuel blend from said aqueous caustic solution;
e) mixing said jet fuel blend with water; and
f) separating said jet fuel blend from said water.

7. The method of claim 6 wherein said contact time is less than about 10 seconds.

8. The method of claim 6 wherein said aqueous caustic solution is an aqueous sodium hydroxide solution.

9. The method of claim 6 wherein said jet fuel blend and said concentrated sulfuric acid are mixed to disperse said concentrated sulfuric acid in said jet fuel as droplets less than about 300 microns in diameter.

10. The method of claim 6 wherein said concentrated sulfuric acid is mixed with said jet fuel blend in an amount equal to from about 1 to about 25 times the stoichiometric amount of concentrated sulfuric acid necessary to react with said nitrogen compounds.

* * * * *